United States Patent
Walls et al.

[15] 3,701,344
[45] Oct. 31, 1972

[54] WATERLESS COOKING APPARATUS

[72] Inventors: Henry M. Walls, DuBois; George M. Sayers, Clearfield; Noel B. Walls, Reynoldsville, all of Pa.

[73] Assignee: Thermo-Sentinel Corporation, DuBois, Pa.

[22] Filed: Aug. 24, 1970

[21] Appl. No.: 66,314

[52] U.S. Cl. ................................................126/388
[51] Int. Cl. ............................................A47j 27/212
[58] Field of Search ........126/388; 99/1, 342; 73/356, 73/358; 116/114.5, 114 V

[56] References Cited

UNITED STATES PATENTS

| 3,294,039 | 12/1966 | Ogden | 73/358 X |
| 1,692,012 | 11/1928 | Weus | 99/342 X |
| 3,352,794 | 11/1967 | Abdo | 73/358 X |

*Primary Examiner*—John J. Camby
*Assistant Examiner*—W. C. Anderson
*Attorney*—Robert F. Custard

[57] ABSTRACT

A waterless cooking apparatus is improved by the provision of a knob having an indicator which by its change of color will enable the cook to manipulate the heat in order to obtain the best results in using waterless cookware. This knob is formed of heat insulated material and has embedded therein a heat sink in metallic contact with an attaching means in direct thermal contact with the cookware cover. A layer of color reversible temperature-sensitive material is positioned on the surface of the heat sink closest to the top of the knob and exposed for observation by the cook. The method of manipulating the heat supply to this cookware to make advantageous use of the two color changes utilized during the normal cooking cycle.

6 Claims, 4 Drawing Figures

PATENTED OCT 31 1972                                  3,701,344

INVENTORS:

HENRY M. WALLS
GEORGE M. SAYERS
NOEL B. WALLS

BY *Robert Duval*
ATTORNEY

WATERLESS COOKING APPARATUS

BACKGROUND OF THE INVENTION

1. Field of the Invention

The present invention has as its primary object the simplification of the use of waterless cookware by the provision of a simple, reliable temperature sensitive indicator device on the knob conventionally attached to the cookware cover.

An additional objective is the provision of a method of cooking utilizing waterless cookware provided with such a special reversible two color temperature-sensitive indicator knob.

A further objective is the provision of such a knob in which the temperature-sensitive reversible color material is applied to a heat sink embedded within the knob and protected from damage and abrasion by a transparent cover layer so that the cookware will not deteriorate and lose the special advantages of such a knob after prolonged use and normal wear and tear.

2. Description of the Prior Art

Prior art cookware of the waterless type has been used for many years and essentially consists of a cooking pot having a smooth circular lip so that a lid closure having a rim configured to match the cooking pot lip may be positioned thereon; and when, during the cooking cycle, the heat is reduced, the cooking pan and lid closure will form a partial vacuum within the cooking pan, and thereby permit the completion of the cooking cycle without the entrance of further air; with the minimum application of heat; and utilizing a minimum of cooking liquid, because the cooking cycle is completed at a lower temperature after the application of heat has ceased. The problem with prior art use of this type of cookware has largely been that it was necessary to listen for the vibration of the cooking lid on the cooking pan in order to know when to turn the heat down, and it was necessary to pay very close attention to the times used in cooking in order to provide the proper cooking time for normal everyday foods. Faced with the task of giving too close attention to the cooking times, the average cook soon utilized the waterless cookware in the same manner as if it had no waterless cookware capacity, and was merely a pan and lid assembly, with the food being boiled in excess water until done, thereby losing all of the advantages of the waterless cooking system.

SUMMARY

The approach utilized by the applicants has been to find a simple device which, when permanently assembled to the waterless cookware apparatus, would provide a simple efficient means for the cook to utilize waterless cookware, and obtain all of the advantages inherent in this system of cooking, but without watching the clock and making mental notes as to when the heat was turned on, lowered, or turned off. In order for such a device to have commercial value it must necessarily be rugged to withstand the normal rough treatment and caustic cleaning solutions used with cookware; and it must have no moving parts in order to provide such ruggedness. Further, such a device must perform the intended function without complicating the cooking process, since many cooks either cannot or will not adapt to complicated systems, which may work in theory, but in practice will soon be discarded.

Applicants invention embodies a novel knob attached to otherwise conventional waterless cookware, preferably, this knob includes a heat sink of thermally conductive material in thermal contact with the metallic lid of the cookware, whereby the heat sink embedded within the knob will accumulate heat, and produce the necessary temperature within a reversible color temperature-sensitive material applied to the top surface of the heat sink, causing this temperature-sensitive material to change from the color associated with its cool state to the color associated with its hot state at a time in the cooking cycle which will provide sufficient residual heat in the cookware assembly to complete the cooking cycle, if the application of further heat is terminated after the time the first color change is observed. Further, this temperature-sensitive material is selected to have the characteristic that it will return to the color associated with its cool state at the time when the contents of the cookware will have been cooked completely and be ready to be immediately used. In essence, the combination of the heat sink, temperature-sensitive material, knob, knob attaching means, and lid serve in combination as a time and temperature integrator so that the food being cooked may be properly prepared by manipulating the heat regulator once when the food cooking cycle is started and the heat source is turned on, and a second time when the first color change is noted and the heat regulator is turned off. Depending upon the time available and the type of food being prepared, the heat may be applied at high, low, or medium rates and the temperature-sensitive material will integrate the time and temperature in such a manner to change color at the proper combination of time and temperature. Further, this material is carefully selected to again integrate the time and temperature as the temperature decreases so that the second color change will take place when the cooking cycle is completed.

BRIEF DESCRIPTION OF THE DRAWINGS

The objectives of the invention and the manner in which it is carried out will be apparent from the following description and the accompanying drawings, wherein.

DESCRIPTION OF THE PREFERRED EMBODIMENT

Figure 1:
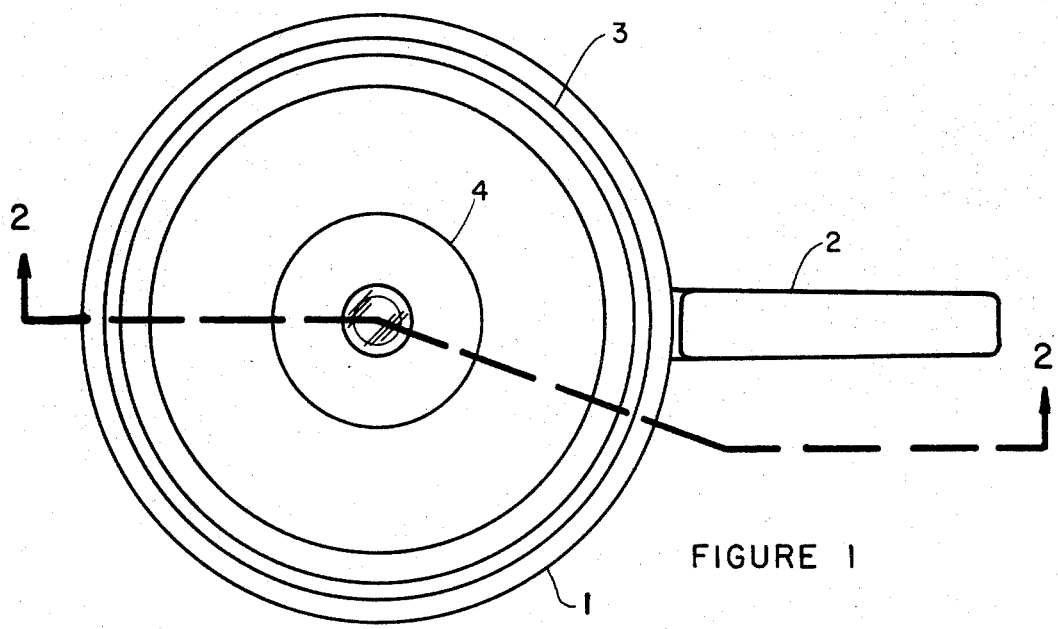
FIG. 1 is a top plan view showing the assembly of cooking pan, cover and temperature-sensitive indicator knob embodying the invention.

Referring to FIG. 1, a cooking pan 1 is shown having a conventional handle 2 for the manipulation thereof, and a cooking pan lid or cover 3 is shown positioned on pan 1. It will be understood that pan 1, handle 2, and cover 3 are of a conventional waterless-cooking type. Pan 1 has a generally cup-shaped configuration, an open top portion, a smooth lip on the top portion, and a sealing portion of the lip which lies in a common plane. Cover 3 is adapted to close pan 1 and has a smooth rim portion, a sealing portion of the rim portion which lies in a common plane, and a configuration to match the sealing portion of the lip of pan 1. All the above features are found in the prior art of waterless cookware.

Figure 2:
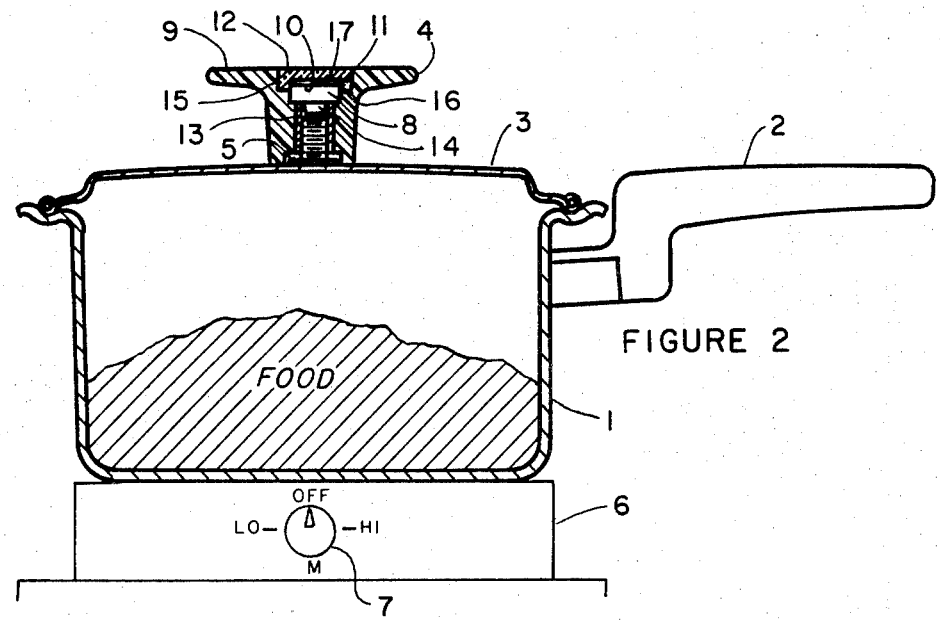
FIG. 2 is a partial sectional view of the assembly of FIG. 1 showing the pan, cover, and knob in cross section, and illustrating a conventional stove and heat control.

Referring to FIG. 2, with pan 1 and cover 3 shown in central cross section, a knob 4 is shown attached to cover 3 by a metallic attaching means 5 which comprises a metallic threaded stud spot welded to cover 3. Knob 4 has a top surface 9 and is composed of heat insulating material so that cover 3 may be manipulated while it is too hot to touch with the hands. FIG. 2 also illustrates a stove 6 having a heat control or regulator 7 including positions corresponding to heat off, on low, on medium, and on high. It will be understood that the stove 6 and regulator 7 are entirely conventional and may be of any type which will supply regulated heat to the cooking assembly shown.

Figures 3, 4:
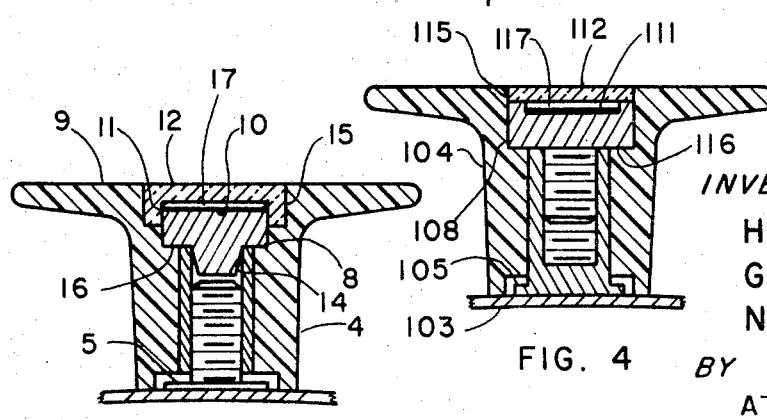
FIG. 3 is an enlarged sectional view of the knob portion shown in FIGS. 1 and 2.
FIG. 4 is an enlarged sectional view of an additional embodiment of the invention illustrating an alternative assembly for the temperature-sensitive indicator knob.

Referring to FIGS. 2 and 3, the improvement comprising the heart of applicants invention is the provision within knob 4 of a metallic heat sink 8 which is in thermal contact with cover 3 through metallic attaching means 5, and embedded entirely within knob 4 so that heat from cover 3 will accumulate at heat sink 8 rather than be readily dissipated to the surrounding atmosphere. Heat sink 8 has a top surface 10 substantially parallel to top surface 9 of knob 4, and top surface 10 of heat sink 8 is coated with a layer or coating 11 of temperature-sensitive reversible color change material. The reversible temperature-sensitive color change layer 11 which has been used is supplied under the trademark "Chromonitor" from the Tempil Corporation, South Plainfield, New Jersey, and has the characteristic of changing color from red to deep maroon (almost black) at 150° to 160° F. and will revert to the normal red color on cooking below 100° F. The consistency is that of a thin lacquer and it may be applied by brushing or spraying techniques. However, it is most commonly applied by dispensing a predetermined volume from a glass or stainless steel metering device. In order to hasten the drying of such material, it may be heated to 180° F. and maintained at this temperature for at least 2 hours. An alternative material to "Chromonitor" would be iodomercurate of copper as described in U.S. Pat. No. 1,692,012, issued Nov. 20, 1928, the color of which is normally bright scarlet but which becomes black when heated to the critical temperature which is about 150° F. This material may be applied by mixing in a solution of gum arabic as a binder. While reference is made herein to specific temperature indicating materials, it will be understood that other temperature indicating materials may be employed having similar critical or color-changing temperatures approximately equal to those set forth herein. It should also be understood that the method of applying this material is susceptible of wide variation, including for example, the use of a chemically inert varnish or other suitable material as a carrier for the iodomercurate of copper instead of the gum arabic.

Other reversible temperature-sensitive color change materials adaptable for use in applicants' apparatus and methods are disclosed in U.S. Pat. Nos. 2,710,274 and 3,219,993.

Referring to FIGS. 2 and 3, a cover 12 for the temperature-sensitive material layer 11 is formed in the shape of a cap and is preferably transparent or translucent plastic through which the color of temperature-sensitive material 11 may be readily determined from the top surface 9 of knob 4. Within knob 4, an internally threaded ferrule 13 is cast integral with the knob material so that knob 4 may be threaded upon attaching means 5 and firmly retained thereon. Heat sink 8 has a reduced diameter protrusion 14 on the lower side thereof which is slightly tapered so that it may be press-fitted within the threads of threaded ferrule 13 and an interference fit of approximately 0.012 inch will provide a limited thermal contact between the metal ferrule 13 and heat sink 8. Heat sink 8 together with layer 11 of temperature-sensitive material and clear plastic cover 12 are assembled as a sub-assembly and pressed into place with a coating of adhesive 15 around the periphery of cover 12 to seal the surface where cover 12 meets a matching recess 16 in knob 4, thereby providing a waterproof and hermetic seal for the knob assembly to withstand abuse and normal wear and tear without deterioration of relatively delicate temperature-sensitive material 11. It will be noted that recess 16 has two shoulders so that heat sink 8 will seat in knob 4 at a first shoulder and cover 12 will seat in knob 4 at a second shoulder leaving an air space 17 between layer 11 and cover 12. A small radius at the inside of cover 12 prevents heat sink 8 from closing air space 17 during assembly. Alternatively, if the nature of layer 11 permits, the small radius at the inside of cover 12 could be omitted and the shoulders in recess 16 positioned to eliminate air space 17.

Referring now to FIG. 4, lid or cover 103 is of conventional type similar to that shown in FIG. 3, and metallic attaching means 105 has an internally threaded upper end and performs a function analogous to that of attaching means 5. Heat sink 108 performs the analogous function of heat sink 8 but has the lower reduced-diameter protuberance threaded to mate with the internal threads of element 105, rather than being tapered as is heat sink 8. Heat sink 108 has a shallow recess in the top surface thereof to accommodate layer 111 and leave an air space 117 between layer 111 and cover 112 after assembly. Alternatively, the shallow recess in heat sink 108 may be omitted and air space 117 eliminated whenever the nature of layer 111 permits the use of such an assembly. Further, the layer of temperature-sensitive material 111 is the same as layer 11. Cover 112 performs the analogous function of cover 12 but is formed as a disc rather than a cap partially surrounding heat sink 8. In the embodiment shown in FIG. 4, knob 104 has a smooth bore therethrough and knob 104 is retained on cover 103 by the action of heat sink 108 being threaded into metallic attaching means 105 and the shoulder of heat sink 108 engaging a mating shoulder of recess 116 in the upper portion of knob 104. In this embodiment, cover 112 is fastened within knob 104 by adhesive applied around the edge of cover 112 where it meets the matching recess 116 in knob 104, thereby making a waterproof surface to protect temperature-sensitive material 111. Air space 117 provides a clearance of about 0.010 inch between material 111 and the underside of cover 112. This air space is desirable with some temperature-sensitive materials 111, such as "Chromonitor."

Referring further to FIG. 3, in carrying out the cooking process of applicants invention, food is placed within pan 1; cover 3 placed on pan 1; the cookware assembly of pan 1 and cover 3 placed on stove 6; and regulator 7 manipulated to provide low, medium, or high heat to the assembly. Up to this point, the method is identical with the prior art. Because the novel knob assembly of applicants invention will change color upon the interior pan reaching and maintaining the proper cooking temperature for the necessary time, the cook utilizing this apparatus and method need only observe when the color of layer 11 exposed to view at the top of knob 4 changes. When the color changes, the heat supplied by stove 6 is discontinued by manipulating regulator 7 to the off position, and the food continues to cook until it is done, at which time the color indicator layer 11 of knob 4 returns to its original color, and the food is removed from the pan and immediately served. Most foods will be cooked without the addition of water, needing only the inherent moisture remaining from the normal pre-cooking washing.

The cooking process and function for the embodiment disclosed in FIG. 4 of the drawings is analogous to that described with FIG. 3 set forth above, however, the fabrication of specific elements of the assembly may be preferred for certain types of cookware.

The art of waterless cooking has been available for many years; however, the unnecessary complication incurred by the cook needing to give close attention to the process, and the noting of necessary time intervals has mitigated against the acceptance of waterless cooking by the average housewife. Therefore, the positive advantages of (1) minimal use of heat energy; (2) the cooking of the food at the minimal temperature in a partial vacuum to retain the maximum amount of food value in the form of vitamins and minerals; and (3) the cooking of the food in the minimum amount of moisture thereby further enhancing the retention of food value in the form of vitamins and minerals have not been available to the average household.

Knobs 4 and 104 are preferably formed of phenolic or other rugged plastic having the necessary heating insulating properties. Metallic attaching means 5 and 105 may be formed of stainless steel or other suitable alloys. Heat sink elements 8 and 108 have been formed of free machining brass, and ferrule 13 has been formed of brass. Covers 12 and 112 have been formed of clear acrylic plastic. Adhesives 15 and 115 may conveniently be any adhesive compatible with both caps 112 and 12 and knobs 104 and 4, respectively. Pan 1, handle 2, and covers 3 and 103 may be of any conventional waterless cookware materials and configurations, including stainless-aluminum-stainless clad materials, and stainless with copper clad bottom assemblies.

While FIGS. 1 to 4 have been shown with the knob assembly portions drawn to approximate scale, the variation of the proportions thereof without changing the functions of the individual components is contemplated to suit the geometry of the cookware to be utilized with applicants' knob assembly.

In view of our invention and disclosures, other variations and modifications will become evident to others skilled in the art, to obtain all or part of the benefits of our invention without copying the structures and methods shown, and we, therefore, claim all such insofar as they fall within the reasonable spirit and scope of our claims.

Having thus described our invention, what we claim as new and desire to secure by Letters Patent is:

1. A waterless cooking apparatus, comprising in combination:
   a. a cooking pan;
   b. a lid adapted to close said pan;
   c. a stove adapted to supply heat to said pan, said stove having a heat regulator;
   d. a knob on said lid, said knob composed of material having a low thermal conductivity, whereby said lid may be manipulated while it is hot; and
   e. attaching means connecting said knob to said lid;
   wherein the improvement comprises:
   f. a heat sink element retained within said knob and in thermal contact with said attaching means, said heat sink element having a top surface;
   g. a coating of reversible color thermally sensitive material in thermal contact with said top surface of said heat sink element, said coating having a first color corresponding to a cool condition and a second color corresponding to a hot condition;
   h. a cover over said coating, and said cover so positioned that said coating is visible through said cover;
   i. said lid, said attaching means, said heat sink element, and said coating of sensitive material constructed of materials having thermal coefficients and so correlated that said coating will maintain said first color during a cooking cycle until a predetermined temperature has been attained and maintained for a predetermined time period and then change to said second color, whereby said regulator of said stove may be manipulated, and the contents of said cooking apparatus cooked in a partial vacuum with a minimal energy expenditure.

2. A cooking apparatus as defined in claim 1 in which there is provided a substantial air space between said cover and said coating.

3. A waterless cooking apparatus, comprising in combination:
   a. a cooking pan having a generally cup-shaped configuration, said pan having an open top portion and a smooth lip on said top portion, said smooth lip having a sealing portion which lies in a common plane;
   b. a lid adapted to close said pan, said lid having a smooth rim portion, said rim portion having a sealing portion which lies in a common plane and, having a configuration to match the configuration of said sealing portion of said lip of said pan;
   c. a stove adapted to supply heat to said pan, said stove having a regulator including at least positions for heat on and heat off;
   d. a knob on said lid, said knob having a top surface and composed of material having a low thermal conductivity, whereby said lid may be manipulated while it is hot; and
   e. a metallic attaching means connecting said knob to said lid;
   wherein the improvement comprises:
   f. a metallic heat sink element retained within said knob and in thermal contact with said attaching means, said heat sink element having a top surface;
   g. a coating of reversible color thermally sensitive material in thermal contact with said top surface of said heat sink element, said coating having a first color corresponding to a cool condition and a second color corresponding to a hot condition;

h. a transparent cover over said coating, said cover having a top surface, and said top surface of said cover so positioned that said coating is visible through said cover at said top surface of said knob; and i. said lid, said metallic attaching means, said heat sink element, and said coating of sensitive material constructed of materials having thermal coefficients and so correlated that said coating will maintain said first color during a cooking cycle until a predetermined temperature has been attained and maintained for a predetermined time period and then change to said second color, whereby said regulator of said stove may be manipulated to a heat off position, and the contents of said cooking apparatus cooked in a partial vacuum with a minimal energy expenditure.

4. A cooking apparatus as defined in claim 3 in which there is provided a substantial air space between said coating of thermally sensitive material and said transparent cover.

5. A lid assembly for a waterless cooking pan, comprising in combination:

a. a lid adapted to close a cooking pan;
b. a knob on said lid, said knob having a top surface and composed of material having a low thermal conductivity, whereby said lid may be manipulated while it is hot; and
c. a metallic attaching means connecting said knob to said lid;

wherein the improvement comprises:

d. a metallic heat sink element retained within said knob and in thermal contact with said attaching means, said heat sink element having a top surface;
e. a layer of reversible color thermally sensitive material in thermal contact with said top surface of said heat sink element, said layer having a first color corresponding to a cool condition and a second color corresponding to a hot condition;
f. a transparent cover over said layer, said cover having a top surface, and said top surface of said cover so positioned that said layer is visible through said cover at said top surface of said knob; and
g. said lid, said metallic attaching means, said heat sink element, and said layer of sensitive material constructed of materials having thermal coefficients and so correlated that said layer will maintain said first color during a cooking cycle until a predetermined temperature has been attained and maintained for a predetermined time period and then change to said second color.

6. A lid assembly for a cooking pan as defined in claim 5 in which there is provided a substantial air space between said layer of thermally sensitive material and said transparent cover.

* * * * *